US009314970B2

(12) United States Patent  
Elsworthy

(10) Patent No.: US 9,314,970 B2  
(45) Date of Patent: Apr. 19, 2016

(54) FLUID-DISPENSING HEAD FOR A 3D PRINTER

(71) Applicant: CEL Technology Limited, Kowloon Bay, Hong Kong (CN)

(72) Inventor: Christopher Thomas Elsworthy, North Somerset (GB)

(73) Assignee: CEL TECHNOLOGY LIMITED, Kowloon Bay, Hong Kong (CN)

( * ) Notice: Subject to any disclaimer, the term of this patent is extended or adjusted under 35 U.S.C. 154(b) by 0 days.

(21) Appl. No.: 14/190,694

(22) Filed: Feb. 26, 2014

(65) Prior Publication Data

US 2014/0242208 A1  Aug. 28, 2014

(30) Foreign Application Priority Data

Feb. 27, 2013 (HK) .................................. 13102506.8

(51) Int. Cl.
*B29C 67/00* (2006.01)
*B29C 31/04* (2006.01)
*B33Y 30/00* (2015.01)

(52) U.S. Cl.
CPC ........... *B29C 67/0059* (2013.01); *B29C 31/042* (2013.01); *B29C 67/0055* (2013.01); *B29C 67/0085* (2013.01); *B33Y 30/00* (2014.12)

(58) Field of Classification Search
CPC ............ B29C 67/0085; B29C 67/0055; B29C 31/042; B29K 2105/0058; B41J 2202/05; B33Y 30/00

USPC .......................................................... 425/375
See application file for complete search history.

(56) References Cited

U.S. PATENT DOCUMENTS

| | | | |
|---|---|---|---|
| 4,679,711 A * | 7/1987 | Trevathan ............. | B42C 9/0006 137/868 |
| 4,705,414 A * | 11/1987 | Guy ....................... | B31J 25/316 347/197 |
| 5,121,329 A * | 6/1992 | Crump ......................... | 700/119 |
| 8,033,811 B2 * | 10/2011 | Swanson et al. .............. | 425/375 |
| 2007/0228590 A1 * | 10/2007 | LaBossiere et al. .......... | 264/40.1 |
| 2009/0035405 A1 * | 2/2009 | Leavitt ............................ | 425/97 |
| 2014/0054331 A1 * | 2/2014 | Muller ................... | B05C 5/0225 222/504 |
| 2015/0035186 A1 * | 2/2015 | Teken et al. ................... | 264/40.4 |
| 2015/0037446 A1 * | 2/2015 | Douglass ............. | B29C 67/0055 425/131.1 |

FOREIGN PATENT DOCUMENTS

JP          07321495 A  * 12/1995

* cited by examiner

*Primary Examiner* — Alison L Hindenlang
*Assistant Examiner* — Jerzi H Moreno Hernandez
(74) *Attorney, Agent, or Firm* — Leydig, Voit & Mayer, Ltd.

(57) ABSTRACT

A head assembly for an extrusion-based 3D printer includes: a fluid-dispensing head having a manifold and at least two fluid-dispensing nozzles, of different sizes, which are mounted in communication with a melt chamber in a manifold. Outlets of each nozzle are closed by respective valve members. A rocker serves both to pivot the nozzles to their lowermost nozzle-operating position and to actuate the valve members, for ready switching between the valves, such that the smaller nozzle can be used for high resolution work, and the larger nozzle can be used for bulk infill.

15 Claims, 10 Drawing Sheets

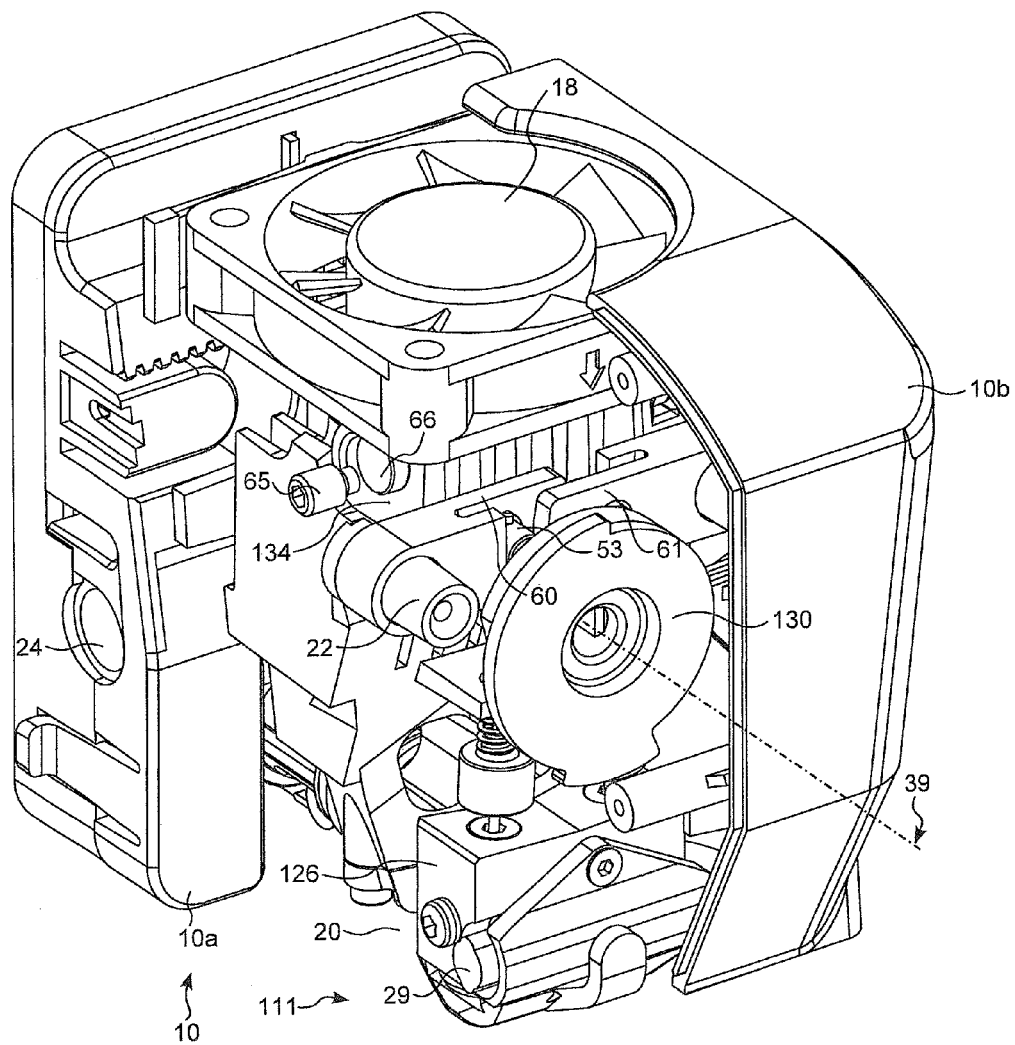
F I G. 5

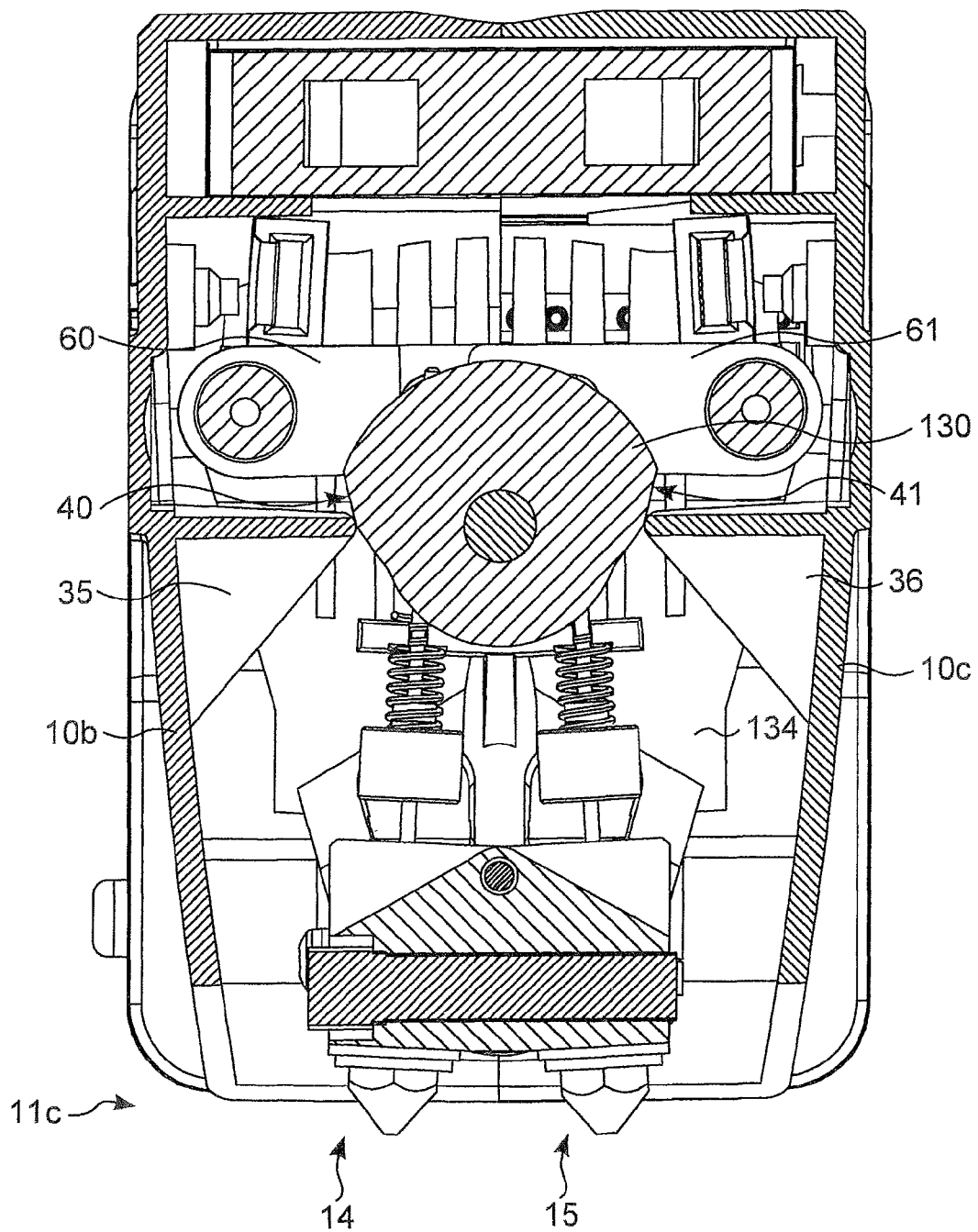
F I G. 7

FLUID-DISPENSING HEAD FOR A 3D PRINTER

TECHNICAL FIELD

The present invention generally relates to additive manufacturing systems for building three-dimensional (3D) parts in a layer-by-layer manner, also known as 3D printers. The invention particularly relates to printing heads used in 3D printers for extruding a flowable part material.

BACKGROUND OF THE INVENTION

In an extrusion-based additive manufacturing system, a 3D part is printed from a digital representation by extruding a flowable part material to build up the part in a layer-by-layer manner. A filament is fed to an extrusion nozzle in the printer head where it is melted, and then ejected onto a substrate in fluid form while the printer head moves in a horizontal plane to trace out a layer. The extruded material fuses to previously deposited material, and solidifies quickly.

The printer head on such a tool should be compact, so as to maximise the size of the object that can be produced, and lightweight, so as to enable it to be rapidly moved and accurately positioned without adverse inertia effects. Providing multiple extrusion nozzles on the printer head allows for improved flexibility, such as the ability to readily change extrusion materials or colours, without nozzle removal and replacement. However, prior designs have not been optimal, and there is a need for a printer head with improved flexibility, which is not compromised by excessive weight, size or structural complexity.

One of the advantages of extrusion-based additive manufacturing is that the capital and operating costs of the tools are lower than for competing technologies, such as stereolithography. However, it has previously been considered that high resolution must be sacrificed in using this technology in order to obtain reasonable operating speeds. There is therefore an unmet need for an extrusion-based additive manufacturing tool that is able to offer both higher resolution and faster operating speed. It is an object of the present invention to address these needs or, more generally, to provide an improved 3D printer.

DISCLOSURE OF THE INVENTION

According to one aspect of the present invention there is provided a printer head assembly for a 3D printer comprising:
a fluid-dispensing head including a manifold;
first and second nozzles mounted to the manifold, each of the first and second nozzles having an outlet closed by a respective valve member;
a coupling member coupling the fluid-dispensing head to a support so as to allow movement of the fluid-dispensing head by which each of the first and second nozzles may be moved to and from a respective nozzle-operating position, wherein with one of the first and second nozzles in its nozzle-operating position the outlet of the other of the first and second nozzles extends below the outlet of the one of the first and second nozzles;
a rocker mounted to oscillate about a rocker axis, the rocker having at least one cam surface engaging a respective fixture for driving the movement of the fluid-dispensing head, the rocker further including first and second abutments engaging respective ones of the valve members for opening or closing the nozzle outlet of each nozzle in its nozzle-operating position, and an actuator controlling the angular position of the rocker.

Preferably the coupling member comprises a pivot and the fluid-dispensing head pivots to move the first and second nozzles to their nozzle-operating positions. Alternatively, for instance, the coupling member may include arcuate or linear rails along which the fluid-dispensing head may be moved, by the rocker, relative to the support so as to place the fluid-dispensing nozzles in their nozzle-operating positions. Preferably the first and second nozzles are of different sizes and are in fluid communication with one another. Alternatively, each nozzle may be fed from a separate supply, so that no communication is provided between the nozzles.

Preferably the at least one cam surface comprises first and second cam surfaces engaging respective first and second fixtures, such that engagement of the first cam surface and first fixture pivots the fluid-dispensing head in a first direction and engagement of the second cam surface and second fixture pivots the fluid-dispensing head in a second direction opposite the first direction.

Preferably the rocker is mounted to the fluid-dispensing head, and the first and second fixtures are disposed on the support. Preferably first and second cam surfaces are external surfaces of the rocker. Preferably first and second abutments include either surfaces: a) disposed at the end of circumferentially elongated slots in the rocker, or b) on the periphery of lobes on the rocker.

Preferably the pivot includes at least one through-extending feed passage in communication with the manifold. Optionally, the pivot includes a plurality of through-extending passages. Preferably the manifold includes a heating element, and the feed passage is adapted to transmit a consumable filament. Preferably the printer head assembly further comprises a mounting member to which the rotary actuator is mounted, and a neck is provided in the pivot adjacent the manifold, providing a thermal bridge separating the manifold from the mounting member.

Preferably the valve members comprise needles that are retractable from the nozzle openings. Preferably the first and second abutments engage respective ones of the needles for opening the nozzle outlets, and a respective spring cooperates with each needle for closing the nozzle outlets.

Preferably a pivot axis of the pivot lies in a central plane substantially symmetrically bisecting the manifold, and the nozzles are disposed on opposing sides of the central plane. Preferably a rocker axis of the rocker is substantially parallel to the pivot axis and lies in the central plane.

Preferably the printer head assembly further comprises a fan mounted to the support for directing a cooling air flow adjacent to the nozzle to increase the speed of solidification. Preferably the fan and manifold are generally disposed on opposite sides of the printer head assembly.

Preferably the support is adapted to be reciprocated linearly along a rail defining one of three orthogonal axes of the 3D printer, and most preferably the support supports linear bearings for engaging the rail. Preferably the support is reciprocated linearly along the rail by an endless belt, and the support includes at least one jaw for gripping the endless belt. In another aspect the invention provides a 3D printer having the printer head assembly of any of the preceding claims, wherein one of three orthogonal axes of the 3D printer is defined by a rail, the support includes an aperture, and the rail is received in the aperture such that the printer head is reciprocated linearly along the rail.

A fluid-dispensing head according to the invention provides for two nozzles that can be readily switched into operation for improved flexibility, without excessive weight, size or structural complexity. Providing large and small nozzles can readily be swapped, allows the nozzles to be selected as required for maximum speed and resolution, for instance, by using the small nozzle to accurately produce exposed finished surfaces and the large nozzle for bulk infill. By proving a single rocker that controls both nozzle position and nozzle actuation, a simple, reliable, compact and lightweight mechanism is also provided.

BRIEF DESCRIPTION OF THE DRAWINGS

Preferred forms of the present invention will now be described by way of example with reference to the accompanying drawings, wherein:

FIG. 5 an isometric view of a second embodiment of a head assembly according to the invention;

FIGS. 6 and 7 are section through the printer head assembly of FIG. 5 in parallel upright planes orthogonal to the pivot axis of the fluid-dispensing head;

DESCRIPTION OF THE PREFERRED EMBODIMENTS

Figure 1:
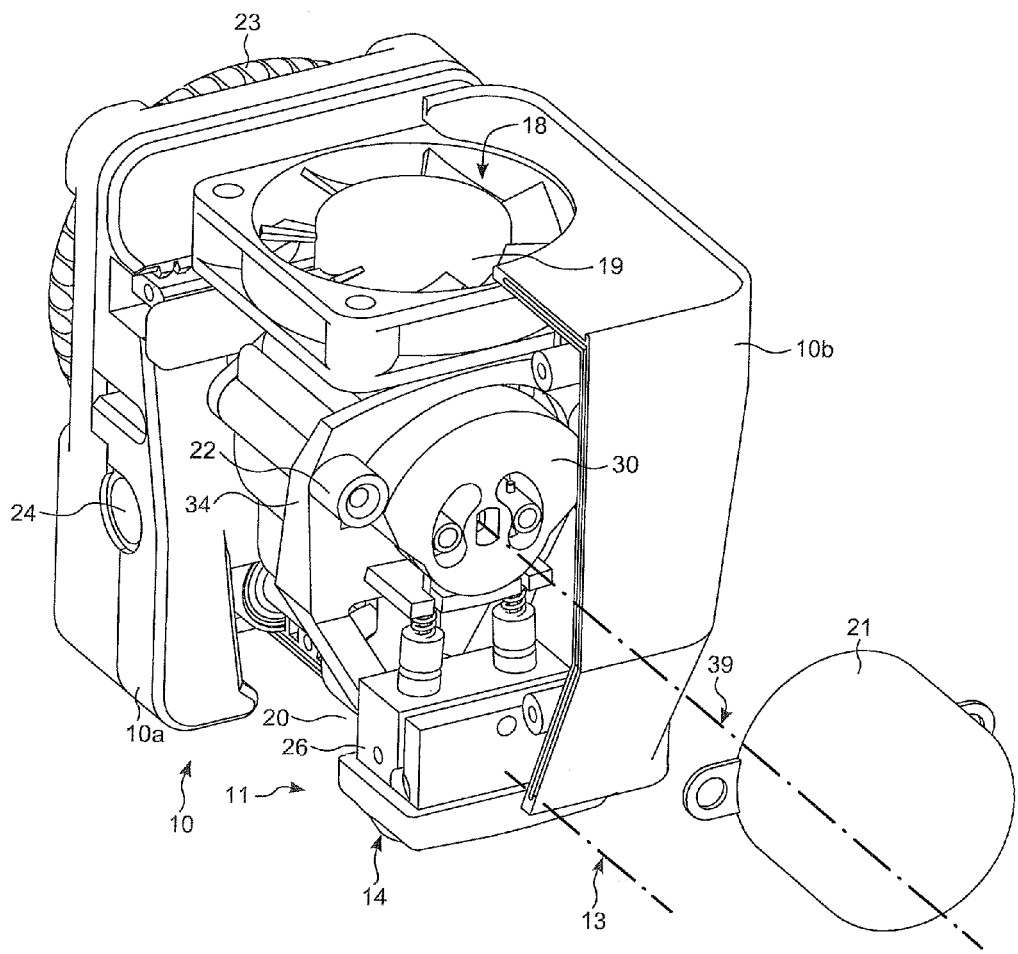
FIG. 1 is an isometric view of a first embodiment of a head assembly according to the invention.
Figure 2:
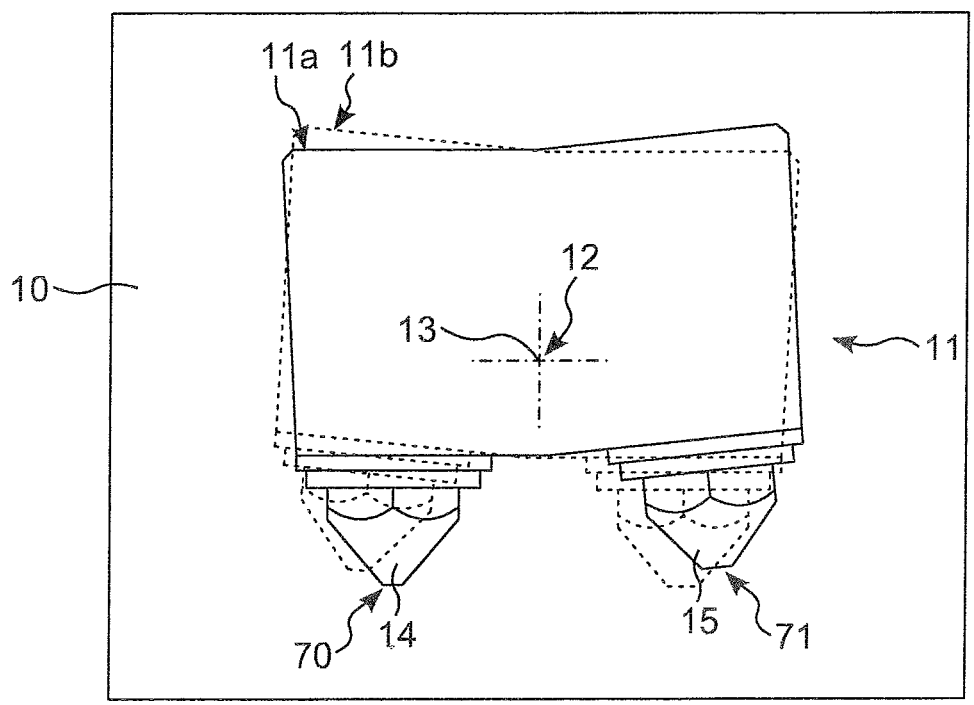
FIG. 2 is a schematic illustrating the operation of the printer head assembly of the invention.

The present disclosure is directed to a print head assembly for use in an extrusion-based 3D printer and in FIGS. 1 to 4 a first embodiment is shown. Referring to FIGS. 1 and 2 of the drawings, the print head assembly generally comprises a structural support assembly or support 10 to which a fluid-dispensing head 11 may be coupled by a pivot 12, allowing the fluid-dispensing head 11 to rotate about a pivot axis 13, relative to the support 10. The fluid-dispensing head 11 includes a manifold 26 which may be fixed to the pivot 12 and to which are mounted first and second nozzles 14, 15.

The fluid-dispensing head 11 generally pivots between a first position indicated by 11a and a second position indicated by 11b and shown in dashed outline in FIG. 2. In position 11a the first nozzle 14 is in its nozzle-operating position in which flowable material may be dispensed, and its outlet 70 extends below the outlet 71 of the second nozzle 15 to ensure that the unused second nozzle is kept clear of the horizontal layer being extruded. The tips of the nozzles 14, 15 are planar, and in positions 11a, 11b the tips of the nozzles 14, 15 are horizontal to assist in smoothing the top of the extrudate. By turning the fluid-dispensing head 11 between the positions 11a, 11b either the first nozzle 14 or second nozzle 15 can be accurately moved to its nozzle-operating position. In this embodiment, the first nozzle 14 may be smaller than the second nozzle 15 and may be used for fine detailing and the second nozzle 15 for bulk filling, thus allowing the 3D printer to select nozzles as required, for instance, based upon an algorithm that determines the optimum printing speed and resolution required to produce a given product.

The printer head assembly is shown upright in FIG. 1. The support 10 provides the main structural and housing elements of the printer head, and comprises a frame 10a and a pair of housing shells 10b, 10c (shell 10c being omitted from FIG. 1 to reveal the fluid-dispensing head 11). An inlet opening 18 is provided at the top of the housing shells 10b, 10c inside which a fan 19 is mounted, to draw air in through the inlet opening 18, ejecting it from an opposing outlet opening 20 at the bottom of the housing shells 10b. The housing shells 10b generally enclose the pivoting fluid-dispensing head 11 and may be connected to one another and to the frame 10a by fasteners (not shown). For use in a Cartesian system, the printer head is adapted to be reciprocated linearly along a straight rail (not shown) defining one of three orthogonal axes of the 3D printer. For this purpose, a rail-receiving aperture 24 may extend horizontally through the frame 10a. The frame 10a may carry linear bearings (not shown) for engaging the rail. At least one jaw (not shown) may be provided on the frame for gripping an endless belt by which the printer head assembly is reciprocated linearly along the rail. A mounting wheel 23 fixed to the frame 10a is located on an rear side of the printer head assembly.

The fluid-dispensing head 11 is an assembly that includes the manifold 26, nozzles 14, 15, a mounting member 34, a rocker 30 and a rotary actuator 21. The rotary actuator 21, is shown in FIG. 1 separated from the bosses 22 on the mounting member 34 to which it is mounted by fasteners (not shown). The rotary actuator 21 is disposed adjacent a front side of the printer head assembly.

Figure 3:
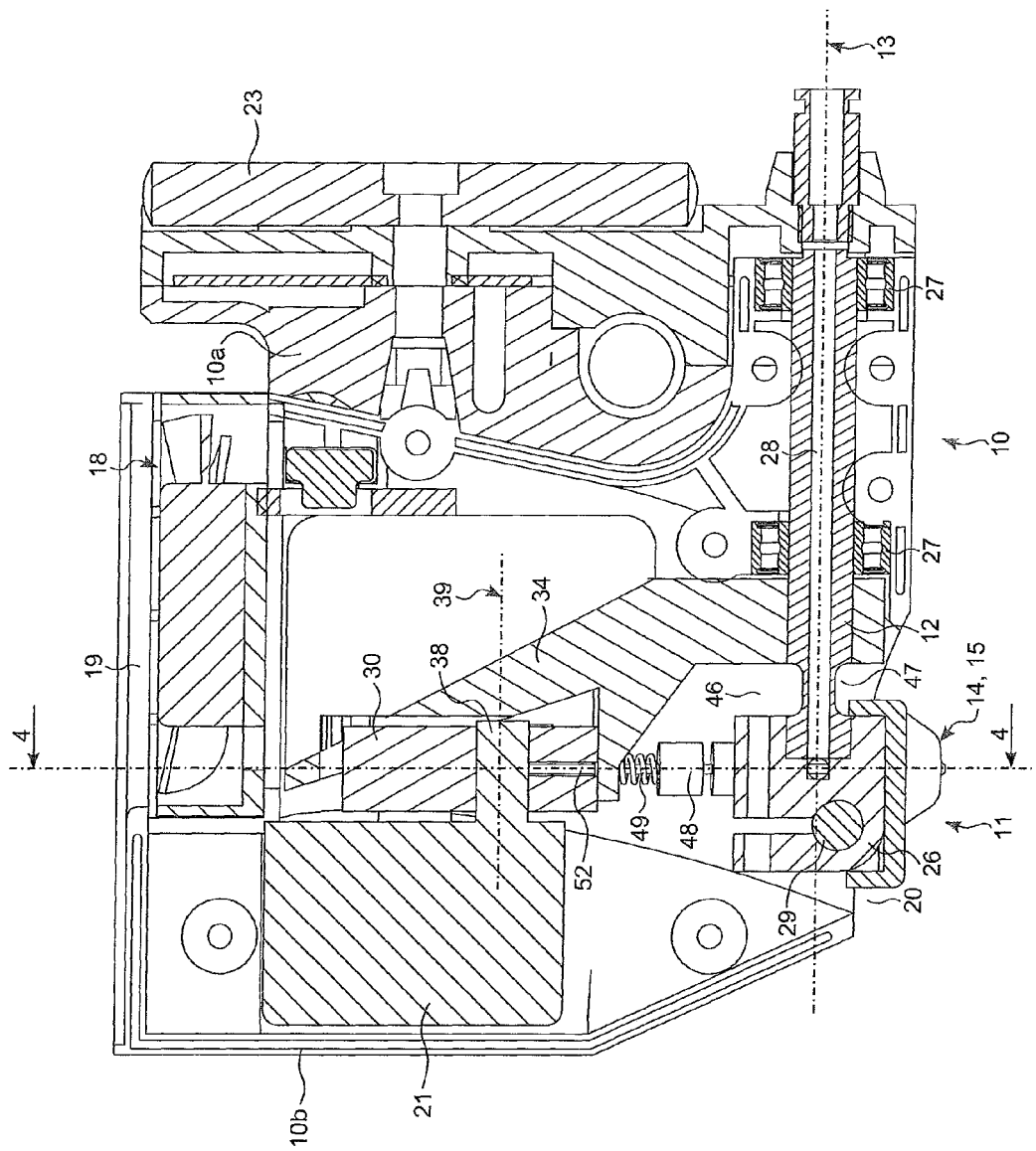
FIG. 3 is a section through the printer head assembly of FIG. 1 in an upright central plane through the pivot axis of the fluid-dispensing head.
Figure 4:
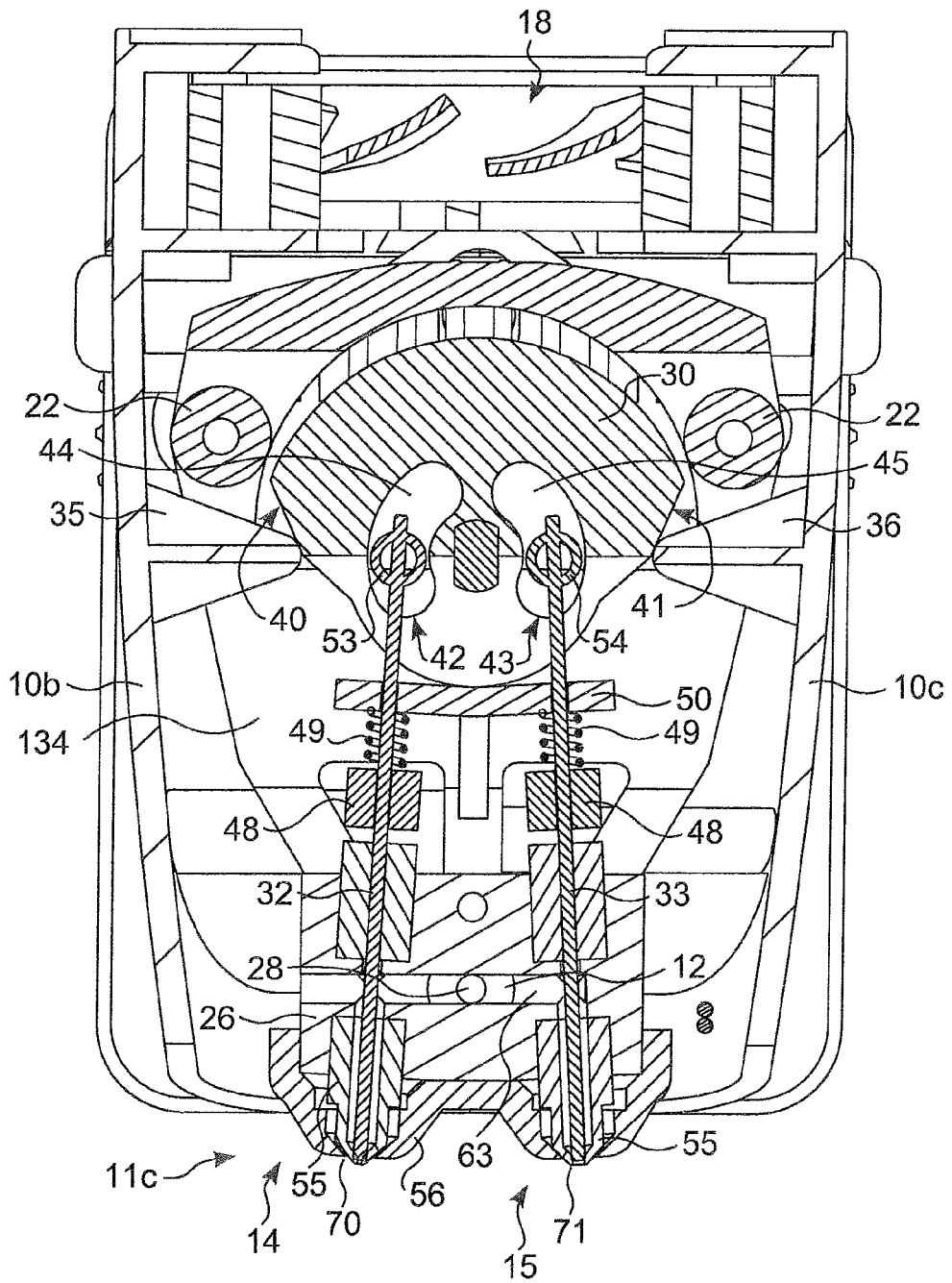
FIG. 4 is section 4-4 of FIG. 3.

With particular reference to FIGS. 3 and 4, the manifold 26 to which the nozzles 14 and 15 are fixed, serves to direct fluid to the nozzles 14, 15. The pivot 12, which may be supported in bearings 27 received in the frame 10a and between the housing shells 10b, 10c and may include an axially extending feed passage 28 adapted to transmit a consumable filament (not shown) into a melt chamber 63 within the manifold 26, the melt chamber 63 communicating with both nozzles 14, 15. The manifold 26 may also include an embedded electrical heating element 29 for melting the filament. The adjacent nozzle outlets 70, 71 of the nozzles 14, 15 may each be closed by a respective valve needle 32, 33 which controls the dispensing of fluid from the printer head. The mounting member 34 may be fixed to the pivot 12, which thereby fixes it to the manifold 26 so that the mounting member 34 oscillates with the manifold 26 relative to the support 10. The mounting member 34 extends generally above the pivot 12 and serves to mount the rotary actuator 21, and the rocker 30 connected thereto and may also support the valve members.

The rocker 30 serves to pivot the fluid-dispensing head 11 and is supported upon a shaft 38 that is oscillated by the rotary actuator 21 about a rocker axis 39 which may be parallel to the axis 13 of the pivot 12. The rocker 30 has first and second cam surfaces 40, 41 that engage respective fixtures 35, 36 which may be integral with the housing shells 10b and 10c respectively. Engagement of the first cam surface 40 and first fixture 35 displaces the rocker 30 relative to the support 10 and drives the pivoting movement of the fluid-dispensing head 11 in a first direction and engagement of the second cam surface 41 and second fixture 36 pivots the fluid-dispensing head 11 in a second direction opposite the first direction direction. In this manner, actuation of the rotary actuator 21 may turn each nozzle 14, 15 to its nozzle-operating position. The first and second cam surfaces 40, 41 may be symmetrically arranged on opposite, external surfaces of the rocker 30. First and second abutments 42, 43 may be formed as internal abutment surfaces disposed at the end of circumferentially elongated slots 44, 45 in the rocker 30 and engage respective ones of the valve needles 32, 33 for opening or closing the nozzle outlets 70, 71.

As best seen in FIG. 3, an air gap 46 may separate the mounting member 34 from the manifold 26 and a neck 47 may be formed in the pivot 12 where it passes through the air gap 46, providing a thermal bridge separating the manifold 26 from the mounting member 34.

Referring to FIG. 4, each valve needle 32, 33 may be fixed to a respective block 48, such that a respective spring 49 held between the blocks 45 and a flange 50 on the mounting member 34 serves to bias the valve needles toward the nozzle outlets 70, 71 to their closed positions. The slender form of the valve needles 32, 33 and the spacing between the blocks 48 and flange 50 minimise the path for conducting heat upwardly from the manifold 26. The upper ends of the valve needles 32, 33 pass through a slot 52 in the lower side of the rocker 30 and cylindrical stoppers 53, 54 are fixed proximate their ends, the stoppers 53, 54 being sized to slide freely within the slots 44, 45 in the rocker 30. The lower ends of the valve needles 32, 33 are supported in the nozzles 14, 15 themselves, the nozzles 14, 15 in turn being located in recesses in the manifold 26. A shroud 56 may generally surround the tip of both nozzles 14, 15. This shroud 56 may be formed of polytetrafluoroethylene, or another non-stick material.

The fan 19 is mounted is to the housing shells 10b of the support 10 generally on the opposite side of the head to the manifold 26. The openings 18, 20 allow a stream of air to pass down from the fan 19 and serves for directing a cooling air flow adjacent to the nozzles 14, 15 to increase the speed of solidification of the extrudate, and for moving cold air over the mounting member 34, in order to keep the cold side of the fluid-dispensing head 11 cold and increase the thermal gradient across the heat bridge between the mounting member 34 and the manifold 26. The housing shells 10b thereby assists in focusing this air stream 18 to flow adjacent to the mounting member 34, manifold 26 and nozzles 14, 15.

Figure 6:
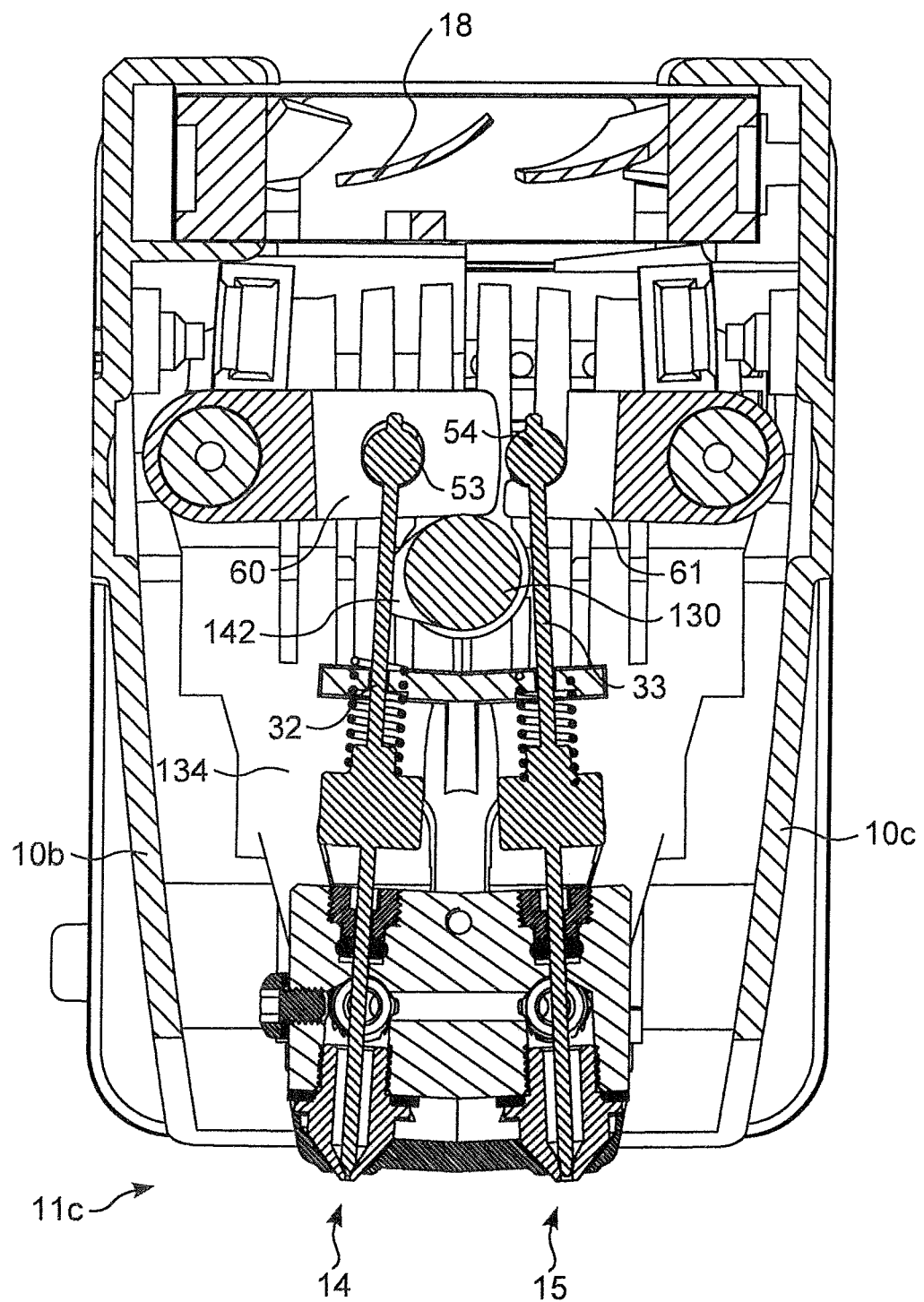

FIGS. 5-11 illustrate a second embodiment of the print head assembly, which is of generally like construction to the first embodiment, and like numbers are used to refer to like components where appropriate. As shown in FIGS. 5 and 6, as in the first embodiment, a rocker 130 in this second embodiment is used both to pivot the fluid-dispensing head 111 between the between the angular positions 11a and 11b and also to open and close the valves by displacing the valve needles 32, 33. Two lever arms 60, 61 may be provided, each mounted to the mounting member 134 to pivot about respective axes parallel to the axis 39 of the rocker 130, as on the cylindrical bosses 22 which also engage fasteners to secure the rotary actuator 21. With their outer ends pivoting on the bosses 22 the inner ends of the arms 60, 61 are positioned adjacent one another and overlapping, but spaced apart in the direction of axis 39 so as they can freely pivot independently of one another. The cylindrical stoppers 53, 54 fixed on the ends of the valve needles 32, 33 are received in complementary openings in the inner ends of the arms 60, 61. In this manner, pivoting of the arms 60, 61 displaces the valve needles 32, 33, opening and closing the valves to control the dispensing of extrudate during printing. The lever action of these arms 60, 61 multiplies the force produced by the rocker for displacing the valve needles 32, 33 compared to the first embodiment in which the abutments 42, 43 of the rocker 30 directly engage the cylindrical stoppers 53, 54. The abutments 142, 143 of the rocker 130, on the other hand, indirectly engage the cylindrical stoppers 53, 54 via the arms 60, 61.

Figure 8:
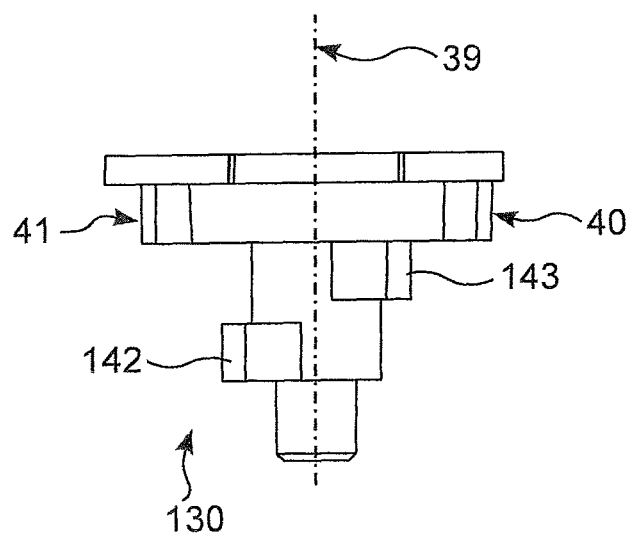
FIGS. 8 and 9 are side and end views respectively, of the rotor of the printer head assembly of FIG. 5.
Figure 9:
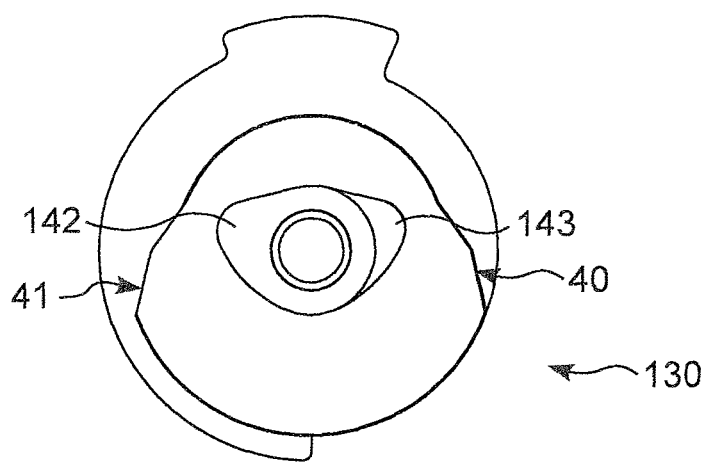

As best seen in FIGS. 8 and 9, the abutments 142, 143 of the rocker 130 are lobes integrally formed on the rocker 130 with convex surfaces that abut and slide along mating faces of the arms 60, 61. The abutments 142, 143 are axially spaced apart from one another, and from the cam surfaces 40, 41 which are aligned transversely to axis 39. The abutment 142 is innermost and abuts the inner end of the arm 60 and the abutment 143 is outermost and abuts the inner end of the arm 61.

Figure 10:
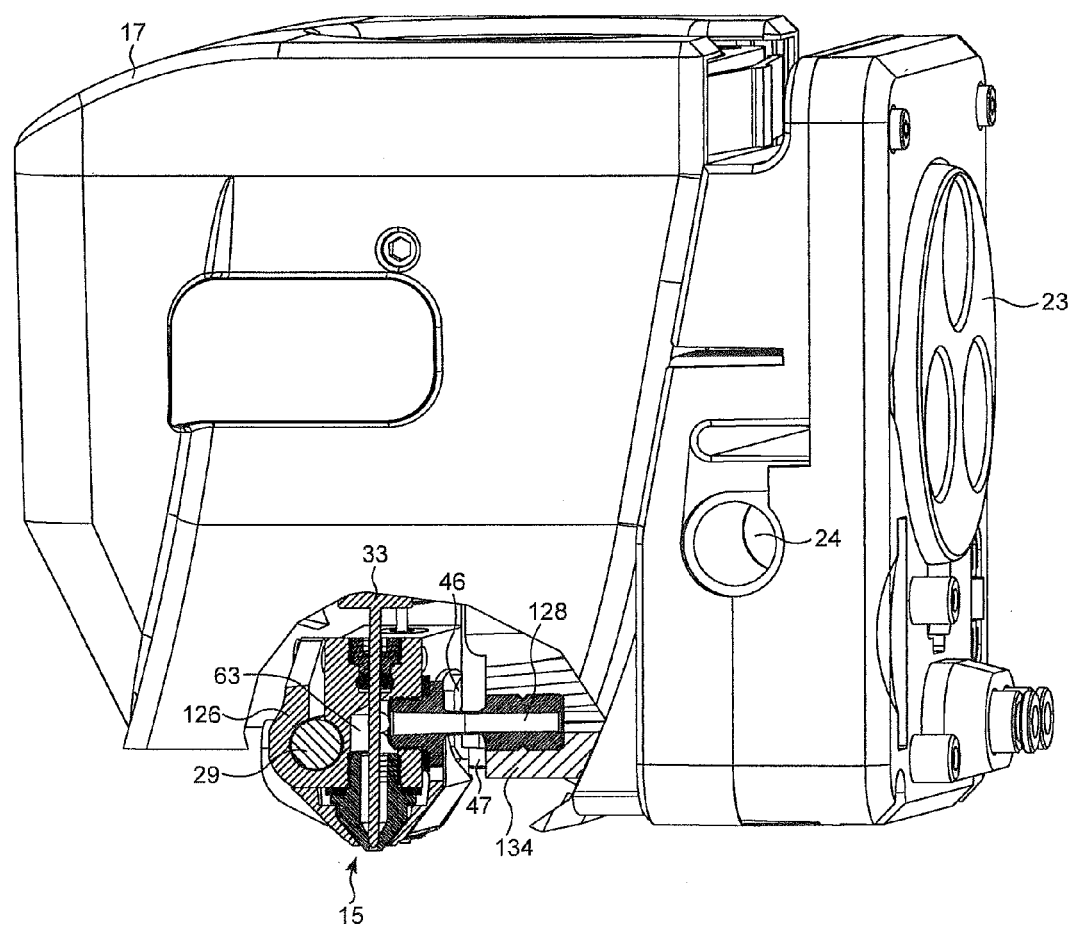
FIG. 10 is a side view of the printer head assembly of FIG. 5 that includes a fragmentary section 10-10 of FIG. 11.
Figure 11:
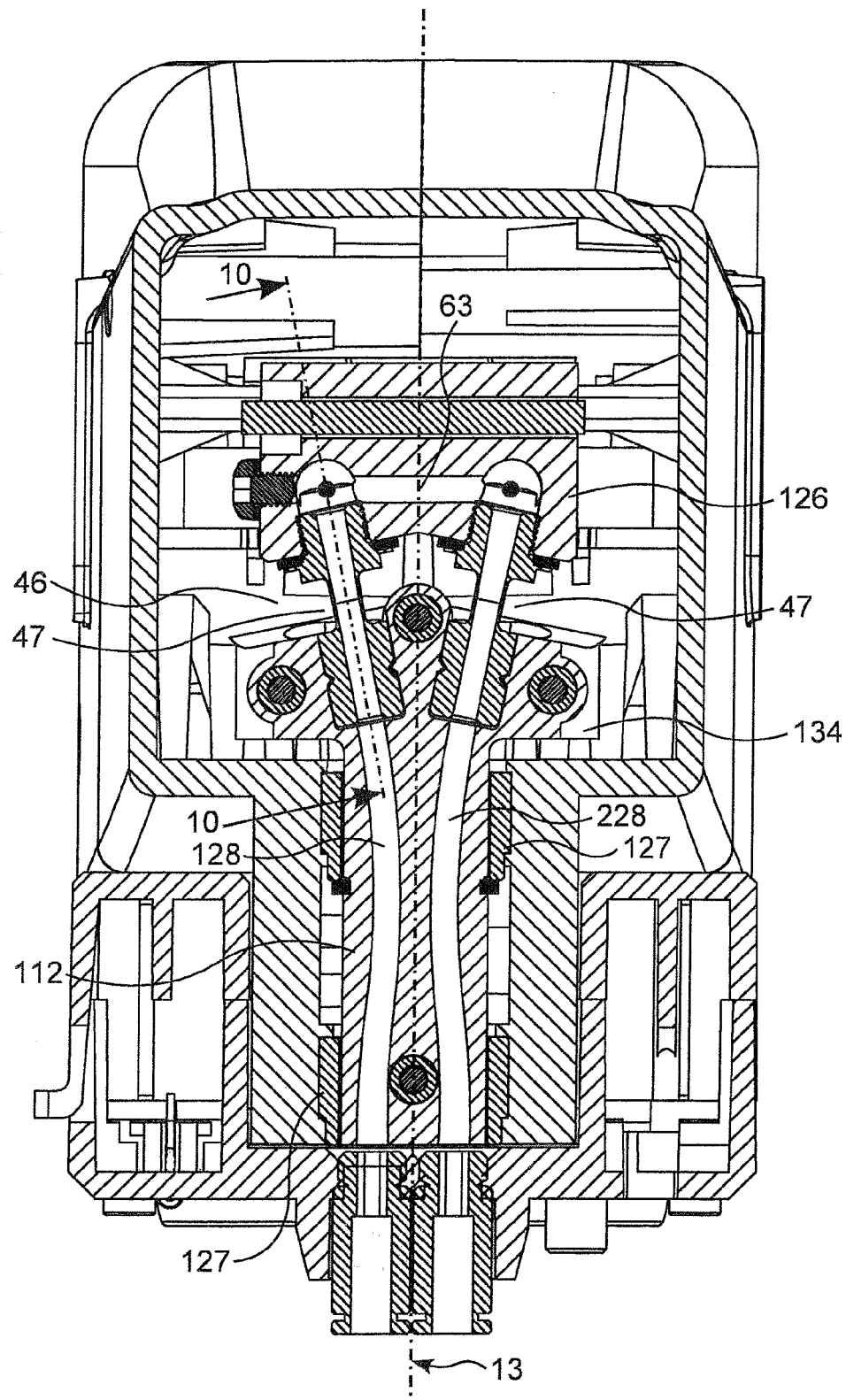
FIG. 11 is a section through the printer head assembly of FIG. 5 in a horizontal plane through the pivot axis of the fluid-dispensing head.

FIGS. 10 and 11 illustrate the construction of the pivot 112 of the second embodiment which supports the fluid-dispensing head 111 in bearings 127 engaging a shaft portion of the pivot 112. The bearings 127 may be fixed between the housing shells 10b of the support 10 and allow the pivot 112 to turn about axis 13. The pivot 112 includes two passages 128, 228 along which two consumable filaments (not shown) may be fed to the melt chamber 63 of the manifold 126. The passages 128, 228 may be arcuate and generally symmetrically disposed either side of an plane bisecting the pivot 112. A neck 47 passing through the air gap 46 may be formed in the pivot 112 by a thin wall section of each of the passages 128, 228 providing a thermal bridge separating the manifold 126 from the mounting member 134.

Adjustable stops limiting the angular positions 11a, 11b are provided by two dog point set screws 65, one on each of the housing shells 10b, 10c which engage with magnets 66 fixed at the top of mounting member 134.

In operation, the fluid-dispensing head 11, 111 can be pivoted between the angular positions 11a and 11b, via the intermediate position 11c illustrated in FIGS. 4, 6 and 7, which is equally angularly spaced between positions 11a and 11b. The fluid-dispensing head 11, 111 is rotated from position 11c anticlockwise to the position 11a, where the first nozzle 14 is in its nozzle-operating position, by rotation of the rocker 30, 130 (in a clockwise direction when viewed from the front as in FIGS. 4, 6 and 7). This rotation of the rocker 30, 130 engages the cam surface 41 with the fixture 36 which is thereby deflected, pivoting the head 11, 111 and attached nozzles 14, 15 about axis 13.

During this turning movement, in the first embodiment (FIG. 4) the stopper 53 slides in the arcuate slot 44 until it abuts the first abutment 42. Continued rotation beyond this point then requires the stopper 53 to rotate with the rocker 30, thereby retracting the needle 32 and thus opening the outlet 130 of nozzle 14. Correspondingly, in the second embodiment (FIG. 7) a circular face of the rocker 130 abuts the arm 60 until it abuts the leading edge of the abutment 142. Continued rotation beyond this point then starts to pivot the lever 60, thereby retracting the needle 32 and thus opening the outlet 130 of nozzle 14. The 3D printer can then, by translating the printer head assembly, lay out one or more layers of extrudate.

In the case of the first embodiment where the first nozzle 14 is smaller than the second nozzle 15 the first nozzle 14 may be used first to accurately establish the surfaces of the object being printed. Once the high resolution surface finishing has been completed using the small nozzle 14, bulk filling behind the perimeter layer is then completed using the large nozzle 15. For instance, three 0.1 mm perimeter layers may be completed using the small nozzle 14 before a single 0.3 mm fill layer is laid down. This change-over is completed by reversing the rotation of the actuator output and the attached rocker 30, rotating the rocker 30 anticlockwise, which reverses the previously described actions, first closing the nozzle outlet then, by cooperation between the cam surface 40 and fixture 35, pivoting the fluid-dispensing head 11 clockwise about pivot 12 through the position 11c, to the position 11b. Likewise, contact between the stopper 54 and the second abutment 43 serves to raise the needle 33 as the rocker 30 continues to pivot, opening the outlet 70 of the smaller nozzle 14.

Aspects of the present invention have been described by way of example only and it should be appreciated that modifications and additions may be made thereto without departing from the scope thereof.

The invention claimed is:

1. A printer head assembly, comprising:
   a support for coupling the printer head assembly to a 3D printer; and
   a fluid-dispensing head including
      a manifold,
      first and second nozzles mounted to the manifold, each of the first and second nozzles having an outlet and a respective valve member opening and closing the respective outlet, wherein, when the outlet of a nozzle is open, the respective nozzle may dispense a flowable material from the manifold onto a substrate,
      a rocker oscillating the fluid-dispensing head about a rocker axis and moving each of the first and second nozzles to and from respective nozzle-operating positions, wherein,
         when one of the first and second nozzles is in its respective operating position, the outlet of the nozzle that is in the nozzle-operating position is open for dispensing the flowable material,
         with one of the first and second nozzles in its nozzle-operating position, the outlet of the other of the first and second nozzles is closed and disposed farther from the substrate than the outlet of the one of the first and second nozzles that is in its nozzle-operating position, and
         the rocker includes
            at least one cam surface for engaging a respective fixture, located on the support, and, upon engagement with the fixture, displacing the rocker and moving the fluid-dispensing head, and
            first and second abutments abutting and engaging respective valve members for opening and closing the outlets of each of the first and second nozzles when a respective nozzle is in its nozzle-operating position, and
      an actuator controlling angular position of the rocker.

2. The printer head assembly of claim 1 further comprising a pivot coupling the fluid-dispensing head to the support, wherein
   the fluid-dispensing head pivots to move the first and second nozzles to and from their respective nozzle-operating positions, and
   the first and second nozzles have different sizes and are in fluid communication with each other.

3. The printer head assembly of claim 2 including first and second fixtures located on the support, wherein the at least one cam surface comprises first and second cam surfaces respectively engaging the first and second fixtures, such that engagement of the first cam surface and the first fixture pivots the fluid-dispensing head in a first direction, and engagement of the second cam surface and the second fixture pivots the fluid-dispensing head in a second direction, opposite the first direction.

4. The printer head assembly of claim 3, wherein
   the first and second cam surfaces are external surfaces of the rocker,
   the rocker includes circumferentially elongated slots, and
   the first and second abutments include surfaces disposed at ends of the circumferentially elongated slots in the rocker.

5. The printer head assembly of claim 2, wherein the pivot includes at least one passage in communication with the manifold.

6. The printer head assembly of claim 5, wherein the manifold includes a heating element, and
   the at least one passage passes a filament of the flowable material.

7. The printer head assembly of claim 5 further comprising:
   a mounting member to which the actuator is mounted, wherein the pivot is fixed to the manifold and to the mounting member so that the mounting member oscillates with the manifold, and
   a neck in the pivot and located adjacent the manifold, wherein the neck provides a thermal bridge thermally separating the manifold from the mounting member.

8. The printer head assembly of claim 1, wherein the valve members comprise needles that are retractable from the outlets.

9. The printer head assembly of claim 8, wherein the first and second abutments engage respective needles for opening the outlets, and including respective springs cooperating with the respective needles for closing the outlets.

10. The printer head assembly of claim 2, wherein
    the pivot has a pivot axis and the pivot axis lies in a central plane substantially symmetrically bisecting the manifold, and
    the first and second nozzles are respectively disposed on opposing sides of the central plane.

11. The printer head assembly of claim 10 wherein the rocker has a rocker axis and the rocker axis is substantially parallel to the pivot axis and lies in the central plane.

12. The printer head assembly of claim 1, wherein the printer head assembly further comprises a fan mounted to the support for directing a cooling air flow adjacent the first and second nozzles.

13. The printer head assembly of claim 12, wherein the fan and the manifold are disposed on opposite sides of the printer head assembly.

14. A 3D printer having the printer head assembly of claim 1, wherein the support includes an aperture for receiving a rail along which the printer head is reciprocated linearly.

15. The printer head assembly of claim 3, wherein
    the first and second cam surfaces are external surfaces of the rocker,
    the external surfaces of the rocker include lobes, and
    the first and second abutments include surfaces on the lobes on the rocker.

* * * * *